(12) United States Patent
Moon et al.

(10) Patent No.: US 8,345,788 B2
(45) Date of Patent: Jan. 1, 2013

(54) METHOD AND APPARATUS FOR DETECTING SIGNAL

(75) Inventors: Young Jin Moon, Daejeon (KR); Young-Il Kim, Daejeon (KR); Kan Zheng, Beijing (CN); Wenbo Wang, Beijing (CN)

(73) Assignee: Electronics and Telecommunications Research Institute, Daejeon (KR)

( * ) Notice: Subject to any disclaimer, the term of this patent is extended or adjusted under 35 U.S.C. 154(b) by 556 days.

(21) Appl. No.: 12/631,426

(22) Filed: Dec. 4, 2009

(65) Prior Publication Data
US 2010/0144302 A1    Jun. 10, 2010

(30) Foreign Application Priority Data

Dec. 5, 2008   (KR) .................... 10-2008-0123301
Oct. 14, 2009  (KR) .................... 10-2009-0097916

(51) Int. Cl.
*H04B 7/02*   (2006.01)
*H04K 3/00*   (2006.01)

(52) U.S. Cl. .................. 375/267; 375/347; 370/210

(58) Field of Classification Search ............. 375/267, 375/347; 370/210; 455/101, 272, 278.1
See application file for complete search history.

(56) References Cited

U.S. PATENT DOCUMENTS

| | | | |
|---|---|---|---|
| 6,600,796 B1 * | 7/2003 | Hassibi | ...................... 375/347 |
| 7,571,203 B2 | 8/2009 | Jeon et al. | |
| 7,787,556 B2 * | 8/2010 | Zhang et al. | .................. 375/267 |

FOREIGN PATENT DOCUMENTS

| | | |
|---|---|---|
| KR | 10-0580843 | 5/2006 |
| KR | 10-0672090 | 1/2007 |

* cited by examiner

*Primary Examiner* — Lee Nguyen
(74) *Attorney, Agent, or Firm* — Staas & Halsey LLP

(57) ABSTRACT

In a method for detecting a signal in a multi-input multi-output wireless communication system that receives signals transmitted through a plurality of transmission antennas by using a plurality of reception antennas, a detection order for detecting the transmission signals received through the reception antennas is determined on the basis of a cofactor determinant of components constituting a channel matrix representing characteristics of channels between the transmission antennas and the reception antennas. In addition, the transmission signal is detected from the signals received through the reception antennas in accordance with the determined detection order.

7 Claims, 5 Drawing Sheets

METHOD AND APPARATUS FOR DETECTING SIGNAL

CROSS-REFERENCE TO RELATED APPLICATION

This application claims priority to and the benefit of Korean Patent Application Nos. 10-2008-0123301 and 10-2009-0097916 filed in the Korean Intellectual Property Office on Dec. 5, 2008 and Oct. 14, 2009, the entire contents of which are incorporated herein by reference.

BACKGROUND OF THE INVENTION (a) Field of the Invention

The present invention relates to a method and an apparatus for detecting a signal, and more particularly, to a method and apparatus for detecting a signal in a multi-input multi-output wireless communication system.

(b) Description of the Related Art

A multiple input multiple output (hereinafter referred to as "MIMO") communication system using multiple transmission/reception antennas and Bell Labs layered space time (BLAST) technology in order to transmit higher-speed data without increasing a bandwidth.

A transmitter transmits different data through a plurality of antennas, and a signal of each of the antennas undergoes independent fading. In the BLAST technology, a receiver discriminates transmitted data through proper signal processing, but signals received from other antennas are overlapped with each other to thereby generate inter-antenna interference (IAI) which is an interference factor increasing the number of errors.

The receiver generally performs steps of detection ordering, interference nulling, and interference cancellation in order to detect the transmitted data.

First, the detection ordering step is a step of determining a detection order. This uses a scheme of selecting and detecting a signal having the largest signal-to-noise ratio for each detection step.

Next, the interference nulling step is performed. In this step, an appropriate weight vector for nulling the remaining signals in order to detect one signal determined during the detection ordering step is multiplied by a received signal vector. The weight vector can be acquired by zero-forcing (ZF) or a minimum mean squared error (MMSE) standard.

Next, the detection signal is regenerated and subtracted from the received signal vector. This step is the interference cancellation step. The reason for the signal processing is to, in the case where a signal is recovered without an error, improve the signal-to-noise ratio by removing an unnecessary interference signal at the time of detecting the subsequent signal.

As such, after the detection order is determined by firstly selecting a signal having the highest signal-to-noise ratio, each signal is detected while multiplying the weight vector by the ZF or MMSE standard each time, and the signal detection step of removing the interference by the detected signal from the received signal is consecutively performed until all signals are detected.

At this time, a step of determining an optimal signal detection order and determining a nulling vector is performed by repeatedly processing acquisition of an inverse matrix of a channel matrix. However, performing the inverse matrices of numerous channel matrices in order to achieve optimal performance cannot be implemented in hardware. In order to implement it, there is a scheme of substituting an inverse matrix processing step or reducing a calculation amount by applying Gram-Schmidt orthogonalization to the channel matrix.

The GSO scheme is flexible in that determining the detection order and determining the nulling vector can be separated from each other. However, the GSO scheme is very sensitive to an error generated during the first signal detection step. More specifically, when an error is generated during the first signal detection step, an error amplification effect in which the error generated at that time is amplified during the subsequent signal detection step is caused, thereby causing a serious problem in the performance of a system.

It is necessary to more accurately determine the signal detection order.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for detecting a signal that can more accurately determine an order for detecting the signal in a MIMO wireless communication system.

Further, the present invention has been made in an effort to provide a method and an apparatus for accurately detecting received signals in a MIMO wireless communication system on the basis of a determined detection order.

An exemplary embodiment of the present invention provides a method for detecting a signal in a multi-input multi-output wireless communication system that receives signals transmitted through a plurality of transmission antennas by using a plurality of reception antennas, that includes: determining a detection order for detecting the transmission signals received through the reception antennas based on cofactor determinants of components constituting a channel matrix representing characteristics of channels between the transmission antennas and the reception antennas; rearranging reception signal vectors representing characteristics of the signals received through the reception antennas in accordance with the determined detection order; detecting a transmission signal determined to be detected in accordance with the detection order by acquiring a nulling vector and applying the nulling vector to the reception signal vector; and cancelling interference in the detected transmission signal.

Another embodiment of the present invention provides a method for determining a signal detection order in a multi-input multi-output wireless communication system that receives signals transmitted through a plurality of transmission antennas by using a plurality of reception antennas, that includes: calculating a covariance matrix for a channel matrix representing channel response characteristics between the transmission antennas and the reception antennas; calculating cofactor determinants of all components in a row of the covariance matrix; and selecting a component having a minimum cofactor determinant among all components based on the calculated cofactor determinants and determining the component as a detection target for the row. Herein, the calculating a cofactor determinant and the determining the component as the detection target are repeatedly performed for all the rows of the covariance matrix of the channel matrix, such that the detection order is determined by determining components selected as the matrices as the detection target in sequence.

Yet another embodiment of the present invention provides an apparatus for detecting a signal in a multi-input multi-output wireless communication system that receives signals transmitted through a plurality of transmission antennas by using a plurality of reception antennas, that includes: a detection ordering determination unit determining a detection order for detecting the transmission signals received through the reception antennas on the basis of a cofactor determinant of components constituting a channel matrix representing characteristics of channels between the transmission antennas and the reception antennas; a signal detection unit detecting the transmission signal determined to be detected in accordance with the detection order from reception signal vectors representing characteristics of the signals received through the reception antennas in accordance with the determined detection order; a hard-decision symbol extraction unit calculating a hard-decision value on the basis of a log likelihood ratio for the received signals; and an interference cancellation unit cancelling interference from the detected transmission signal on the basis of the hard-decision value and an interference cancellation factor acquired by using a signal-to-noise ratio.

DETAILED DESCRIPTION OF THE EMBODIMENTS

Figure 1:
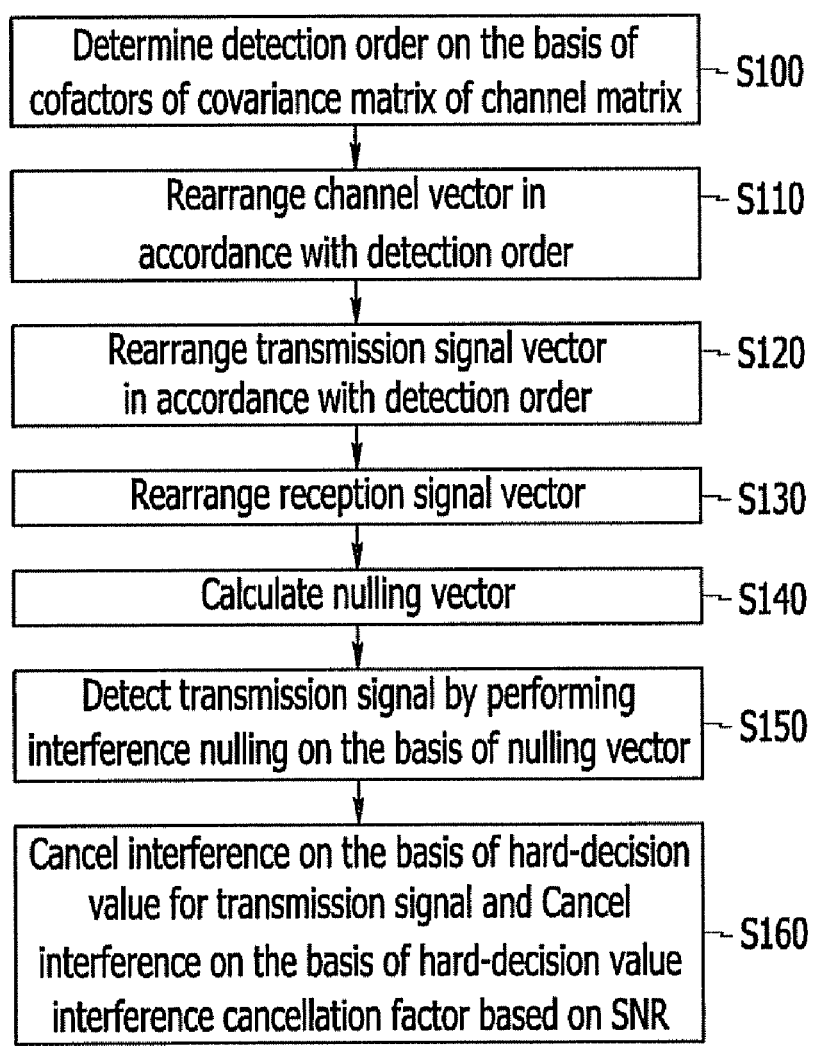
FIG. 1 is a flowchart of a method for detecting a signal according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

Hereinafter, exemplary embodiments of the present invention will be described with reference to the accompanying drawings.

FIG. 1 is a flowchart of a method for detecting a signal according to an exemplary embodiment of the present invention.

A MIMO communication system according to an exemplary embodiment of the present invention includes a plurality of reception antennas and a plurality of transmission antennas, and the number of transmission antennas is the same as the number of reception antennas.

More specifically, the MIMO communication system includes $N_t$ transmission antennas and $N_r$ reception antennas. A transmission signal vector transmitted through the transmission antenna can be represented by $x=[x_1, \ldots x_{Nt}]^T$. Elements $x_i$ of the transmission signal vector x represent a transmission symbol.

In the case of the transmission signal, signals transmitted through $N_t$ transmission antennas are respectively received in the reception antennas through a fading channel.

A channel matrix can be expressed as follows in a frequency domain.

$$H = \begin{bmatrix} H_{1,1} & \cdots & H_{1,Nt} \\ \vdots & \ddots & \vdots \\ H_{Nr,1} & \cdots & H_{Nr,Nt} \end{bmatrix} = [H_1 \ldots H_{Nt}] \quad \text{[Equation 1]}$$

Herein, H represents an N×N matrix, a channel vector corresponding to an i-th transmission antenna is represented by $H_i=[H_{1,i} \ldots H_{Nr,i}]^T$, and T represents a prefix operator.

A reception signal vector for the signals received through the channel matrix is represented by $y=[y_1, \ldots y_{Nr}]^T$, and on the basis of it, the reception signal y can be expressed as follows.

$$y = Hx + n \quad \text{[Equation 2]}$$
$$= \sum_{n=1}^{Nt} H_n x_n + n$$

$x_n$ is a signal matrix having as elements symbols transmitted as an N×1 matrix, and n as an N×1 matrix constituted by noise generated from a receiver is the zero-mean complex additive white Gaussian noise (AWGN) of which the mean is 0 and the distribution is $N_0$.

In the exemplary embodiment of the present invention, in order to detect the transmitted transmission signal from the transmitter, a detection order $D=(d_1, \ldots d_{Nt})$ is first determined (S100).

Figure 2:
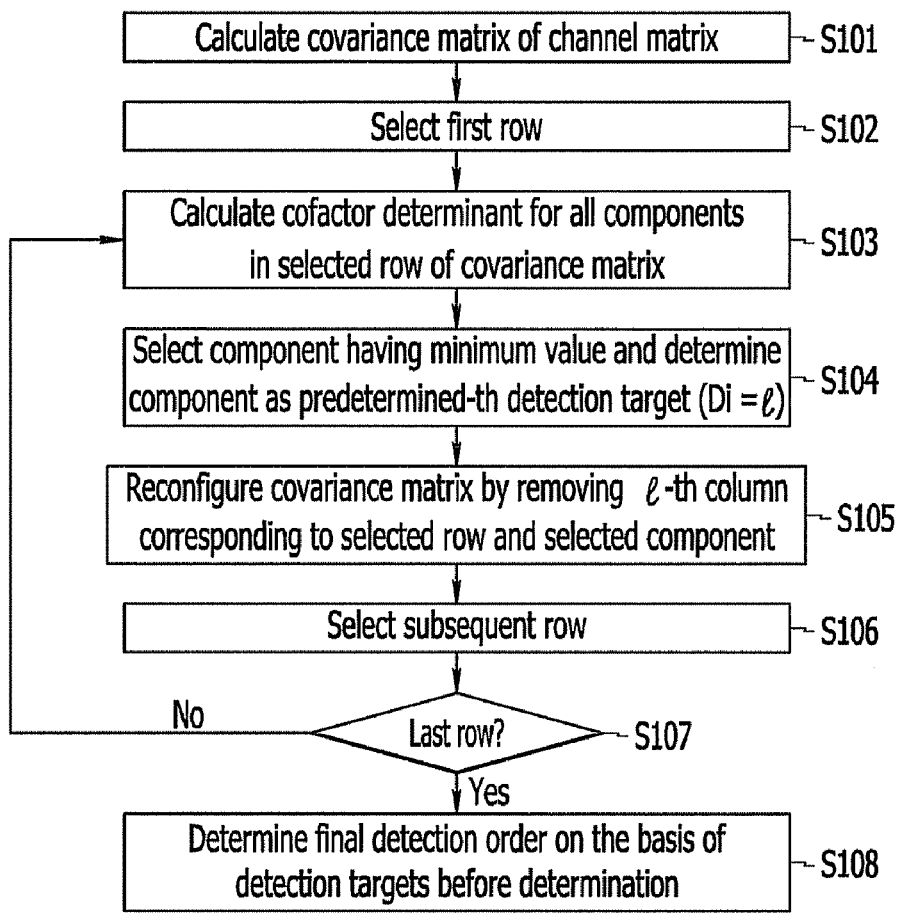
FIG. 2 is a flowchart showing a step of determining a detection order according to an exemplary embodiment of the present invention.

FIG. 2 is a flowchart showing a step of determining a detection order according to an exemplary embodiment of the present invention.

Referring to FIG. 2, when the detection order determining step is more specifically described, a covariance matrix $Z=H^H H$ for a channel matrix H is first calculated (S101).

Next, cofactor determinants of all components in a first row of the calculated covariance matrix are calculated (S102 and S103). In addition, by selecting a component having a minimum value among the cofactor determinants of all the components in the first row of the calculated covariance matrix, a first detection target in the detection order is determined (S104). That is, in the case where a cofactor determinant of a component of an l-th column of the first row has the minimum value $d_1=l$. This means that as a signal to be performed during the first signal detection step, a transmission symbol, that is, a transmission signal, is first detected from a reception signal emitted from an l-th antenna.

After the first detection target is determined, a covariance matrix Z is newly reconfigured by removing the first row and the l-th column from the covariance matrix Z (S105).

By repeatedly performing the above-mentioned step with respect to all rows of the covariance matrix Z (S106 and S107), the overall detection order is determined (S108).

After the overall detection order $D=(d_1, \ldots d_{Nt})$ for the signals received through the reception antennas is determined, the interference nulling step is performed based on the detection order determined as shown in FIG. 1.

First, the channel vector $H=\{H_1, \ldots, H_{Nt}\}$ is rearranged in accordance with the overall detection order $D=(d_1, \ldots d_{Nt})$ (S110). The rearranged channel vector is represented by $\bar{H}=\{H_{d_{Nt}}, \ldots, H_{d_1}\}$.

In addition, the transmission signal vector $x=[x_1, \ldots x_{Nt}]^T$ is also rearranged in accordance with $D=(d_1, \ldots d_{Nt})$ (S120). The rearranged transmission signal vector is represented by $\bar{x}=[x_{d_{Nt}}, \ldots x_{d_1}]^T$.

The reception signal vector rearranged on the basis of the rearranged channel vector and the transmission signal vector can be represented as follows (S130).

$$y = \bar{H}\bar{x} + n \quad \text{[Equation 3]}$$

Next, the nulling vector is calculated (S140).

The rearranged channel vector $\bar{H}$ is QR-decomposed as follows.

$$\bar{H} = B \cdot K \quad \text{[Equation 4]}$$

Herein, $B=[b_1 \ldots b_{Nt}]$ is a unitary matrix and $K$ is an upper triangle matrix.

In addition, when Gram-Schmidt orthogonalization (GSO) is applied to the rearranged channel vector $\bar{H}$ for easy implementation, the channel vector $\bar{H}$ rearranged in accordance with Equation 4 is applied to the reception signal vector of Equation 3, and a Hermitian matrix of the unitary matrix B is multiplied by both vectors, the following result is acquired. The Hermitian matrix is a matrix acquired by switching a row and a column of the unitary matrix B with each other and converting matrix components into conjugate complex numbers, respectively.

$$R = B^H y \quad \text{[Equation 5]}$$
$$= K\bar{x} + B^H n$$

Herein, R is a zero-forcing (ZF) matrix acquired by applying weights nulling the remaining symbols to the reception signal in order to detect the predetermined transmission symbol, and $B^H$ is the Hermitian matrix of the unitary matrix B.

As described above, the nulling vector that is rearranged on the basis of the overall detection order and is subjected to GSO processing, that is, the channel vector $\tilde{H}$, is applied to the reception signal vector, and the Hermitian matrix of the unitary matrix B is applied, and the remaining signals other than a signal to be detected are nulled in accordance with the detection order determined during the detection ordering step so as to detect the signal (S150).

Next, an interference cancellation step of regenerating, that is, finally detecting the signal detected by the interference nulling step, is performed. In particular, in the exemplary embodiment of the present invention, detection and partial IAI cancellation steps are performed.

Equation 5 can be more specifically expressed as shown in Equation 6.

$$\begin{bmatrix} R_1 \\ \vdots \\ R_{Nr-2} \\ R_{Nr-1} \\ R_{Nr} \end{bmatrix} = \begin{bmatrix} k_{1,1} & \ldots & k_{1,Nt-2} & k_{1,Nt-1} & k_{1,Nt} \\ \vdots & \ddots & \vdots & \vdots & \vdots \\ 0 & \ldots & k_{Nt-2,Nt-2} & k_{Nt-2,Nt-1} & k_{Nt-2,Nt} \\ 0 & \ldots & 0 & k_{Nt-1,Nt-1} & k_{Nt-1,Nt} \\ 0 & \ldots & 0 & 0 & k_{Nt,Nt} \end{bmatrix} \begin{bmatrix} x_{d_{Nt}} \\ \vdots \\ x_{d_3} \\ x_{d_2} \\ x_{d_1} \end{bmatrix} + \begin{bmatrix} n'_1 \\ \vdots \\ n'_{Nr-2} \\ n'_{Nr-1} \\ n'_{Nr} \end{bmatrix} \quad \text{[Equation 6]}$$

Herein, the transmission signal detected by using the ZF scheme can be expressed as follows.

$$\tilde{x}_{d_n} = \frac{1}{k_{n,n}} \left( R_n - \sum_{i=1}^{n-1} \rho_{d_i} k_{n,i} \hat{x}_{d_i} \right) \quad \text{[Equation 7]}$$

Herein, $\tilde{x}_{d_n}$ is a signal detected according to the exemplary embodiment of the present invention, and $\hat{x}_{d_i}$ is a hard-decision value of $\tilde{x}_{d_n}$ extracted by using a signal acquired during a decoding step corresponding to a modulation scheme. In addition, $\{\rho_{d_i}, i=1, \ldots, N_t-1\}$ represents a partial OSIC factor. The POSICF is a value to allow a mean squared error to be minimized. For example, the value of the POSICF in a 4×4 antenna configuration can be acquired as follows.

$$\rho_{d_1} = \left(1 + \frac{1}{\gamma_4}\right)^{-1} \quad \text{[Equation 8]}$$

$$\rho_{d_2} = \left[1 + \frac{(1-\rho_4)^2 \|k_{3,4}\|^2}{\|k_{3,3}\|^2} + \frac{1}{\gamma_4} \frac{\|k_{4,4}\|^2}{\|k_{3,3}\|^2} \left(1 + \frac{\rho_4^2 \|k_{3,4}\|^2}{\|k_{4,4}\|^2}\right)\right]^{-1}$$

$$\rho_{d_3} = \left[1 + \frac{(1-\rho_3)^2 \|k_{2,3}\|^2}{\|k_{2,2}\|^2} + \frac{(1-\rho_4)^2 \|k_{2,4}\|^2}{\|k_{2,2}\|^2} + \frac{1}{\gamma_4} \frac{\|k_{4,4}\|^2}{\|k_{2,2}\|^2} \left(1 + \frac{\rho_3^2 \|k_{2,3}\|^2}{\|k_{3,3}\|^2} + \frac{\rho_4^2 \|k_{2,4}\|^2}{\|k_{4,4}\|^2}\right)\right]^{-1}$$

Herein, $\|k_{i,j}\|^2$ is a mean value of a square of $k_{i,j}$. $\gamma_4$ can be expressed by the signal-to-noise ratio as follows.

$$\gamma_4 = E\left\{\frac{\|k_{4,4} x_{d_1}\|^2}{N_0}\right\} \quad \text{[Equation 9]}$$

As such, interference is cancelled from the transmission signal on the basis of the hard-decision value for the transmission signal and the POSICF acquired by using the signal-to-noise ratio. The cancelled interference signal is decoded afterwards and as a result, the transmission signal is finally detected. Meanwhile, by subtracting the detected transmission signal from the reception signal vector, the detected signal is prevented from serving as interference with respect to a signal to be subsequently detected.

The order in which the signal is more accurately detected according to the exemplary embodiment of the present invention is determined, and the signal detection and the interference cancellation are performed on the basis of the determined order, thereby effectively reducing an error amplification effect generated while the receiver detects the transmission signal.

Further, it is possible to reduce the error amplification effect by partially cancelling an interference factor instead of completely cancelling the interference factor at the time when the receiver detects the signal and using a partial ordering series interference cancellation factor (POSICF) determined by a post-SNR of a ZF detection scheme.

Next, an apparatus for detecting a signal according to an exemplary embodiment of the present invention, which adopts the signal detection method, will be described.

Figure 3:
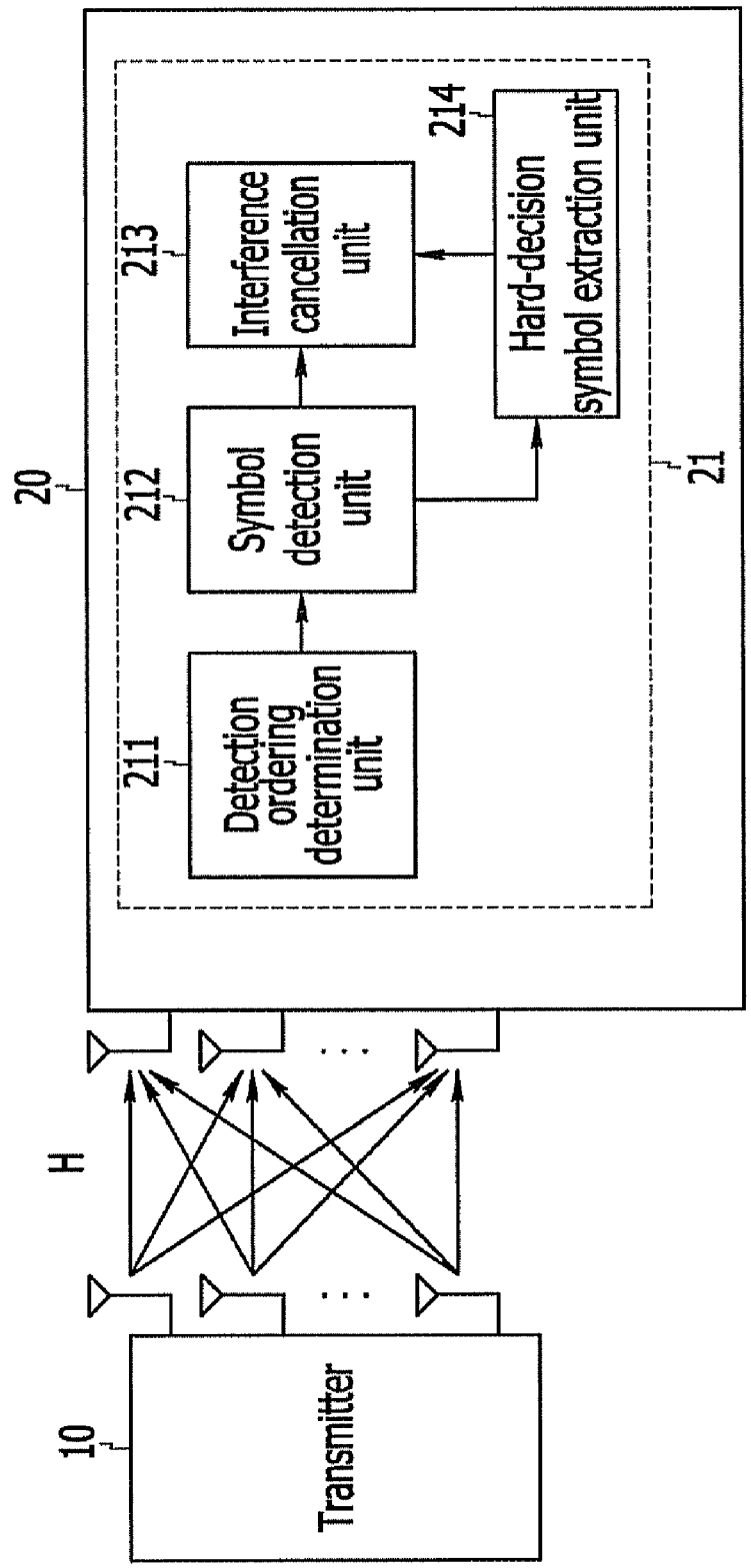
FIG. 3 is a diagram showing a structure of an apparatus for detecting a signal according to an exemplary embodiment of the present invention.

FIG. 3 is a diagram showing a structure of an apparatus for detecting a signal according to an exemplary embodiment of the present invention.

As shown in FIG. 3, the signal detection apparatus according to the exemplary embodiment of the present invention is included in a transmitter 10 transmitting signals through N transmission antennas and a receiver 20 that communicates through N reception antennas.

Distortion of signals received through the reception antennas of the receiver 10 generated by multiple path fading of a MIMO channel may be preferentially compensated, and the reception signals are transmitted to a signal detector 21.

The signal detector 21 includes a detection ordering determination unit 211, a symbol detection unit 212, an interference cancellation unit 213, and a hard-decision symbol extraction unit 214.

The detection ordering determination unit 211 acquires a covariance matrix of a channel matrix for the reception signals inputted through the reception antennas and calculates a cofactor determinant of corresponding components for each row of the acquired covariance matrix, and sets a component having a cofactor of the minimum value as a detection target so as to determine the detection order for the reception signals. Herein, the detection target is determined in the corresponding row by performing a step of reconfiguring the covariance matrix while removing a row in which the detection target is determined and a row where the component determined as the detection target is positioned for each row. Therefore, ordering for detecting the transmission signal from the reception signals through each reception antenna is determined. That is, orders through which antenna the transmission signal will be detected from a received signal are determined.

The symbol detection unit 212 detects the transmission symbol, that is, the transmission signals, on the basis of the determined detection order. In particular, by rearranging the components of the channel matrix representing channel transmission characteristics of the reception signals in accordance with the detection order, and acquiring and applying the nulling vector to the channel matrix, symbols of the transmission signal to be detected are nulled.

The hard-decision symbol extraction unit 214 calculates a hard-decision value on the basis of a log likelihood ratio for the reception signals, and the interference cancellation unit 213 cancels the interference on the basis of the hard-decision value for the corresponding signal and the POSICF acquired by using the signal-to-noise ratio with respect to the signal detected by the symbol detection unit 212.

In particular, the symbol detection unit 212, the interference cancellation unit 213, and the hard-decision symbol extraction unit 214 repeatedly perform the above-mentioned steps in accordance with the detection order.

The signal detection apparatus having the above-mentioned structure according to the exemplary embodiment of the present invention operates on the basis of the signal detection method, and those skilled in the art can implement the operation of the signal detection apparatus on the basis of the method. Therefore, a detailed description of the operation of the signal detection apparatus will be omitted.

Figure 4:
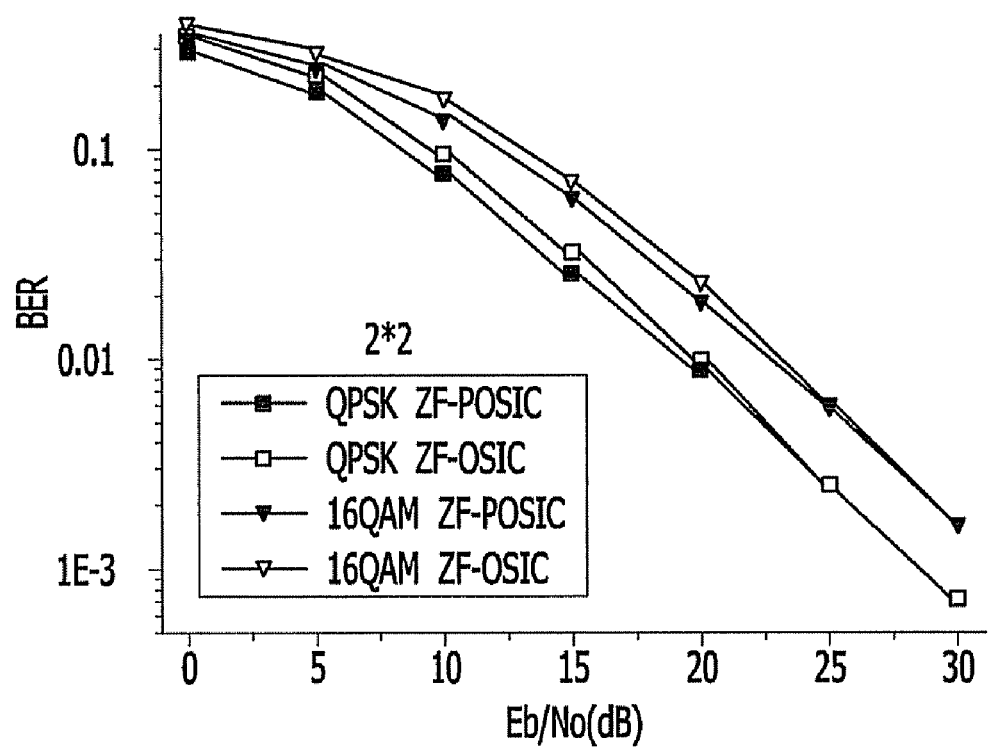
FIGS. 4 and 5 are graphs shown for comparing a method for detecting a signal according to an exemplary embodiment of the present invention with a known method.
Figure 5:
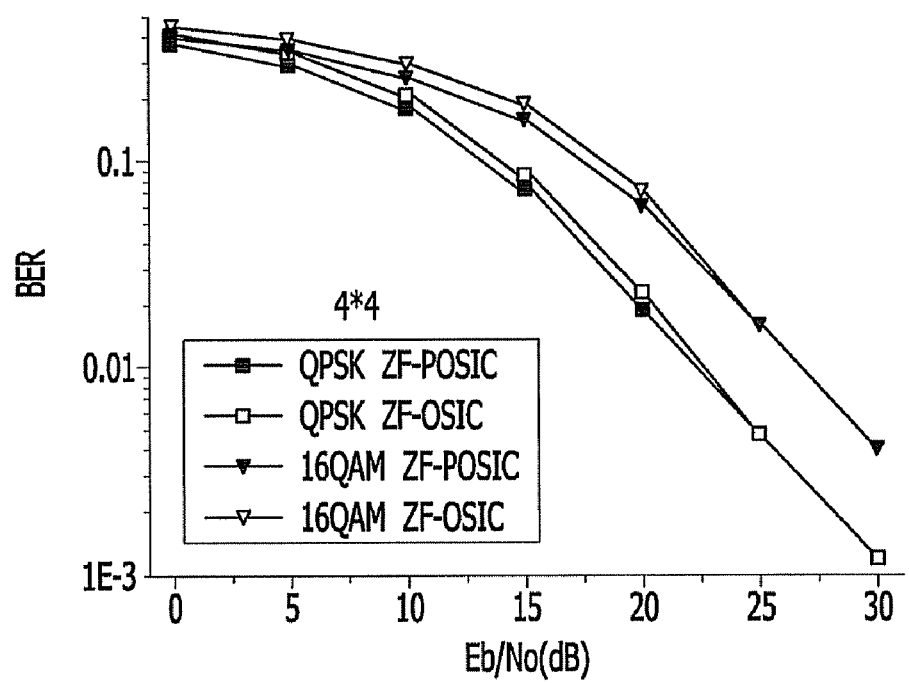

Results shown in FIGS. 4 and 5 can be acquired by simulating the signal detection apparatus and the signal detection method according to the exemplary embodiment of the present invention.

FIGS. 4 and 5 are graphs shown for comparing a method for detecting a signal according to an exemplary embodiment of the present invention with a know method. Herein, for convenience of description, the signal detection method according to the exemplary embodiment of the present invention is referred to as a ZF-POSIC method, and the known signal detection method is referred to as a ZF-OSIC method.

Parameters used at the time of simulating the signal detection method and apparatus according to the exemplary embodiment of the present invention are shown below.

TABLE 1

| Parameter | Value |
|---|---|
| Frequency band | 2.3 GHz |
| Channel bandwidth | 8.75 MHz |
| Sampling frequency | 10 MHz |
| FFT size | 1024 |
| CP rate | 1/8 |
| Subcarrier allocation | FUSC |
| Antenna configuration | 2 × 2, 4 × 4 |
| Modulation | QPSK, 16OQAM |
| Terminal speed | 3 km/h |
| Channel estimation | Ideal |

Referring to FIGS. 4 and 5, the ZF-POSIC method can acquire a gain of 0.5 dB SNR in comparison with the ZF-OSIC method.

Through simulation of applying the signal detection method according to the exemplary embodiment of the present invention to the MIMO wireless communication system having the 2×2 and 4×4 antennas, the ZF-POSIC method has better signal detection performance without additional complicated calculation in comparison with the known method.

According to an embodiment of the present invention, it is possible to effectively reduce an error amplification effect generated while detecting a received signal in a MIMO wireless communication system.

The above-mentioned exemplary embodiments of the present invention are not embodied only by an apparatus and/or method. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for detecting a signal in a multi-input multi-output wireless communication system that receives signals transmitted through a plurality of transmission antennas by using a plurality of reception antennas, comprising:

determining a detection order for detecting the transmission signals received through the reception antennas based on a cofactor determinant of components constituting a channel matrix representing characteristics of channels between the transmission antennas and the reception antennas;

rearranging reception signal vectors representing characteristics of the signals received through the reception antennas in accordance with the determined detection order;

detecting a transmission signal determined to be detected in accordance with the detection order by acquiring a nulling vector and applying the nulling vector to the reception signal vector; and cancelling interference in the detected transmission signal, wherein the rearranging reception signal vectors includes: rearranging a channel vector corresponding to the channel matrix in accordance with the detection order; rearranging a transmission signal vector representing a characteristic of the transmission signal in accordance with the determined detection order; and rearranging the reception signal vector on the basis of the rearranged channel vector and transmission signal vector, wherein the detecting a transmission signal includes: applying Gram-Schmidt Orthogonalization (GSO) to the rearranged channel vector and applying the channel vector in accordance with the result to the reception signal vector; and nulling signals other than the transmission signal to be detected by applying a Hermitiain matrix of a unitary matrix to the reception signal vector.

2. The method of claim 1, wherein the determining a detection order includes: calculating a covariance matrix for the channel matrix; calculating cofactor determinants of all components in a row of the covariance matrix; and selecting a component having a minimum cofactor determinant among all components based on the calculated cofactor determinants and determining the component as a detection target for the row.

3. The method of claim 2, wherein the calculating a cofactor determinant and the determining the component as the detection target are repeatedly performed for all the rows of the covariance matrix of the channel matrix, such that the detection order is determined by determining a component selected for each row as the detection target in sequence.

4. The method of claim 2, further comprising reconfiguring the covariance matrix by removing a row in which the detection target is determined and a column of the component determined as the detection target for the row from the covariance matrix, wherein, in the calculating a cofactor determinant, the cofactor determinant is calculated for the reconfigured covariance matrix.

5. The method of claim 1, wherein in the cancelling interference, the interference is cancelled from the transmission signal on the basis of a hard-decision value for the transmission signal and an interference cancellation factor acquired by using a signal-to-noise ratio.

6. An apparatus for detecting a signal in a multi-input multi-output wireless communication system that receives signals transmitted through a plurality of transmission antennas by using a plurality of reception antennas, comprising:

a detection ordering determination unit determining a detection order for detecting the transmission signals received through the reception antennas based on cofactor determinants of components constituting a channel matrix representing characteristics of channels between the transmission antennas and the reception antennas;

a signal detection unit detecting the transmission signal determined to be detected in accordance with the detection order from reception signal vectors representing characteristics of the signals received through the reception antennas in accordance with the determined detection order;

a hard-decision symbol extraction unit calculating a hard-decision value on the basis of a log likelihood ratio for the received signals; and an interference cancellation unit cancelling interference from the detected transmission signal on the basis of the hard-decision value and an interference cancellation factor acquired by using a signal-to-noise ratio.

7. The apparatus of claim 6, wherein the detection ordering determination unit calculates a covariance matrix for the channel matrix, and the detection order is determined by repeatedly selecting a component having a minimum cofactor determinant among all components in a row of the covariance matrix as a detection target for the row for each row of the covariance matrix.

* * * * *